United States Patent [19]
Dahl et al.

[11] Patent Number: 5,682,812
[45] Date of Patent: Nov. 4, 1997

[54] FRUIT STEAM PEELER

[75] Inventors: Jeffery A. Dahl; Robert L. Frenkel, both of Fresno, Calif.

[73] Assignee: FMC Corporation, Chicago, Ill.

[21] Appl. No.: 444,640

[22] Filed: May 19, 1995

[51] Int. Cl.[6] .............................. A23N 7/00; A23N 7/02; A23N 7/10; A47J 17/00
[52] U.S. Cl. .................. 99/630; 99/624; 99/626; 99/584
[58] Field of Search ................. 99/483, 516, 534–536, 99/584, 585, 586, 587, 623–630; 15/3.16–3.2

[56] References Cited

U.S. PATENT DOCUMENTS

| | | | |
|---|---|---|---|
| 281,512 | 7/1883 | Hudson | 99/626 X |
| 2,208,239 | 7/1940 | Anderson | 99/626 |
| 2,772,471 | 12/1956 | Leng | 99/623 X |
| 3,192,974 | 7/1965 | Hickey et al. | 99/627 |
| 3,396,769 | 8/1968 | Hirahara | 146/231 |
| 3,480,057 | 11/1969 | Wilhelm | 99/548 X |
| 3,811,000 | 5/1974 | Lazzarini | 426/483 |
| 3,854,395 | 12/1974 | Hirahara | 99/630 |
| 4,023,477 | 5/1977 | Hirahara et al. | 99/585 |

OTHER PUBLICATIONS

FMC SP 20 Steam Peeler System, © 1991 By FMC Corporation, 6 pages.

*Primary Examiner*—Timothy F. Simone
*Attorney, Agent, or Firm*—Michael B. K. Lee; Douglas W. Rudy

[57] ABSTRACT

The invention provides an improved peeler of fruits such as tomatoes. The peeler passes the tomatoes through a pressure inlet valve to a high temperature stem in a pressurized system. The tomatoes then are passed through a pressure outlet valve to a flexible cable peeler, which helps to remove the peels from the tomatoes. A chute passes the tomatoes from the flexible cable peeler to a pinch roller, which removes the remainder of the peels.

10 Claims, 7 Drawing Sheets

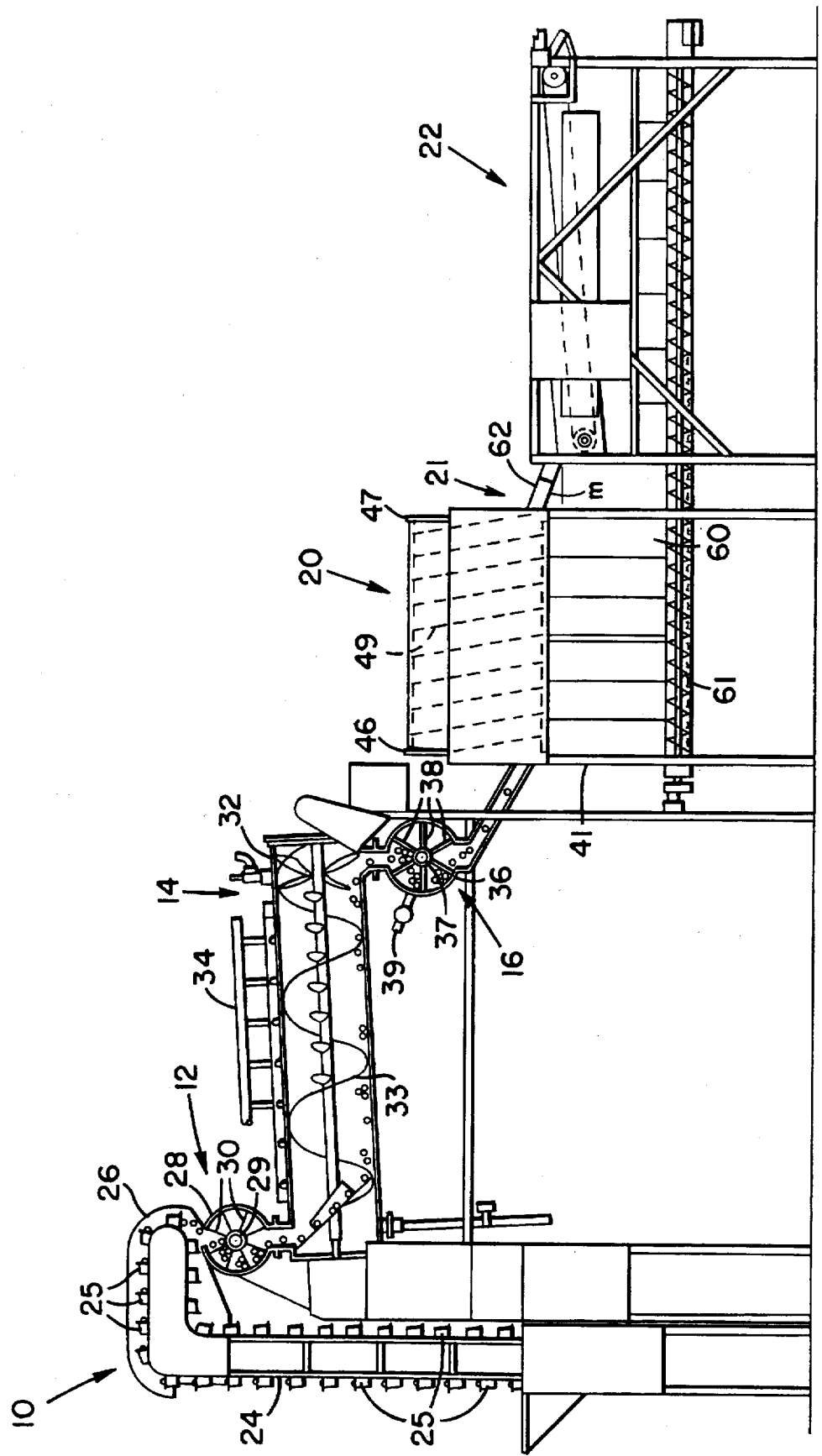

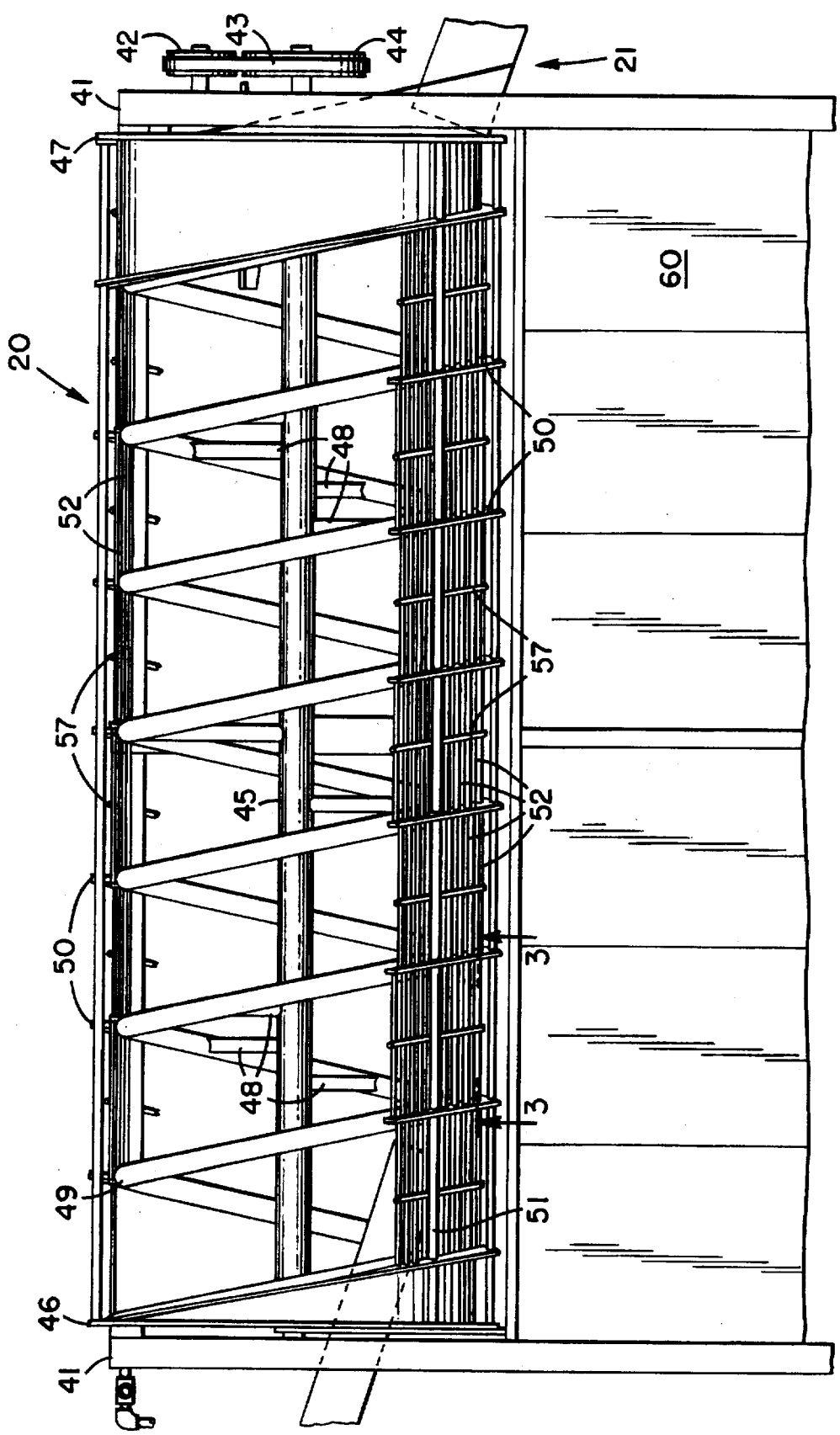
FIG_2

FIG_3
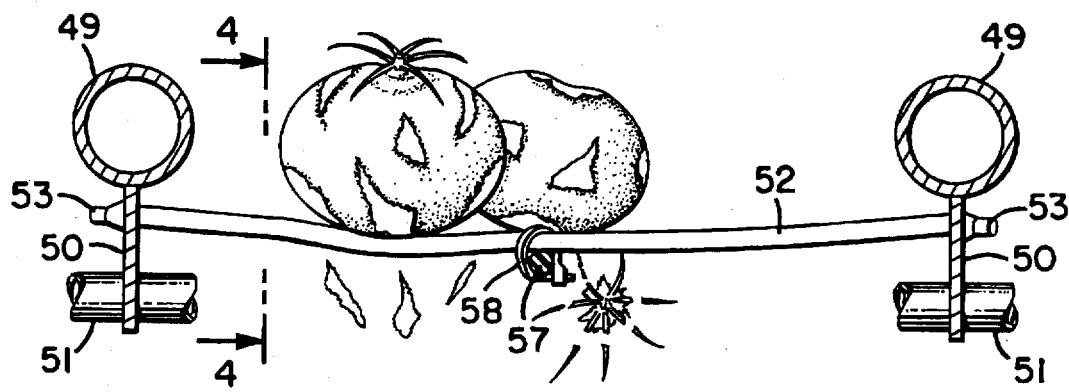
FIG_4
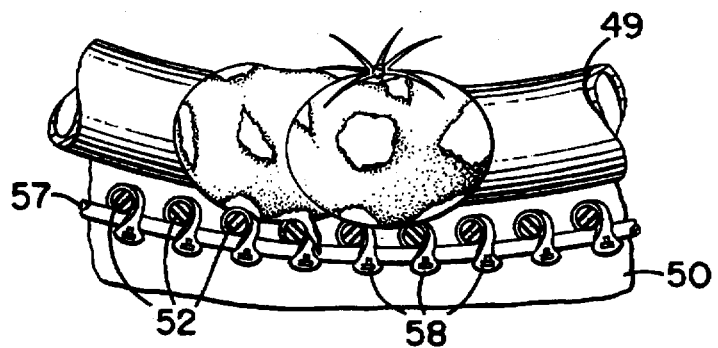

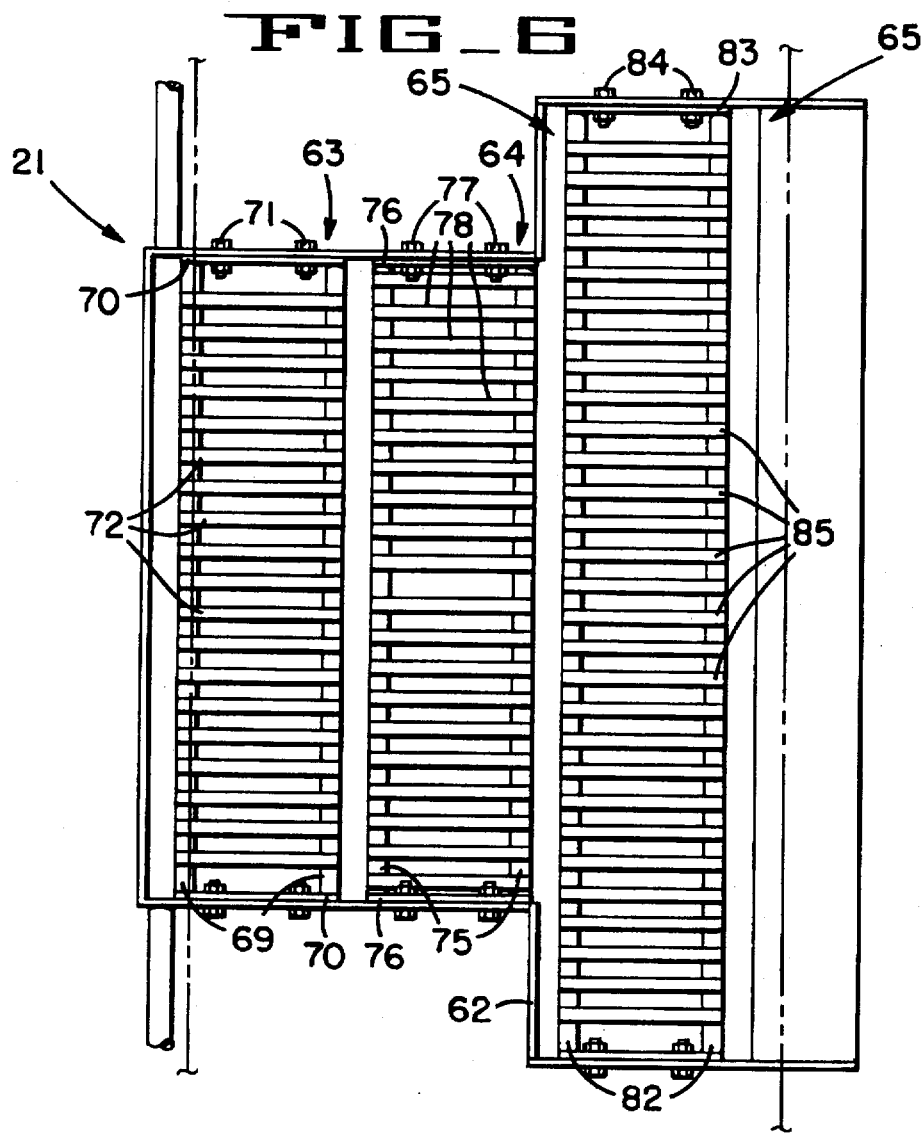
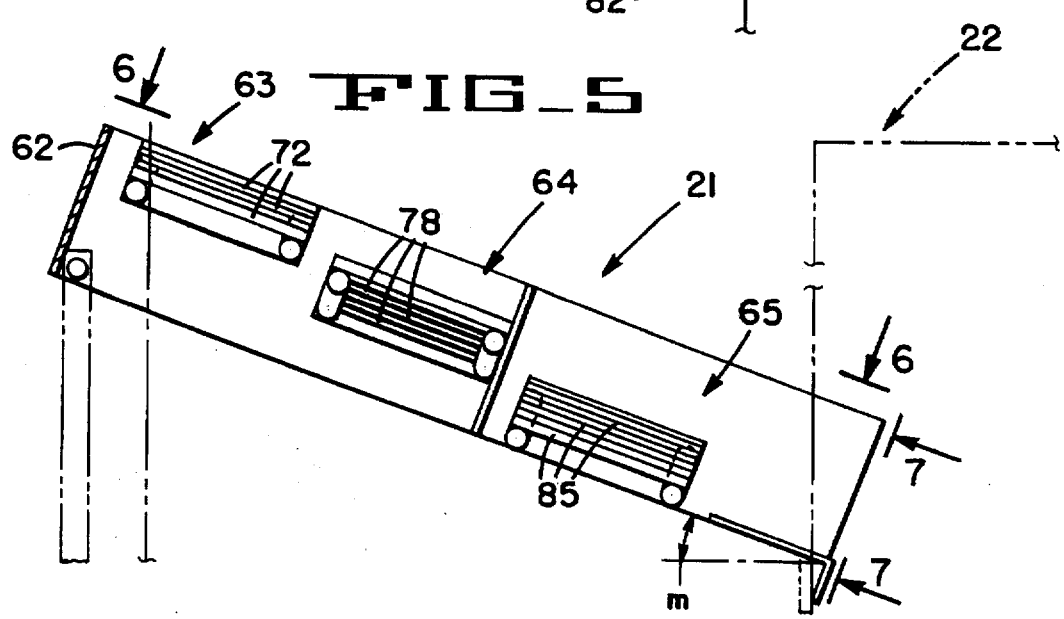

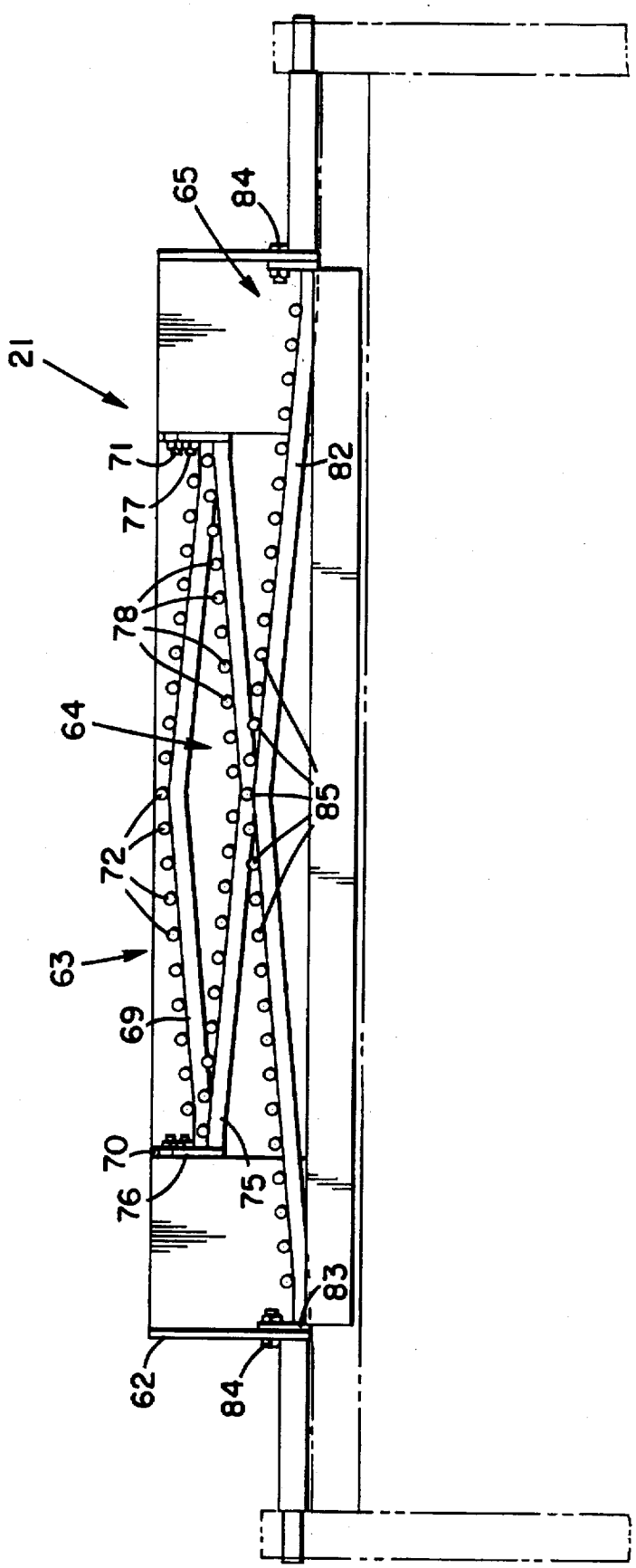

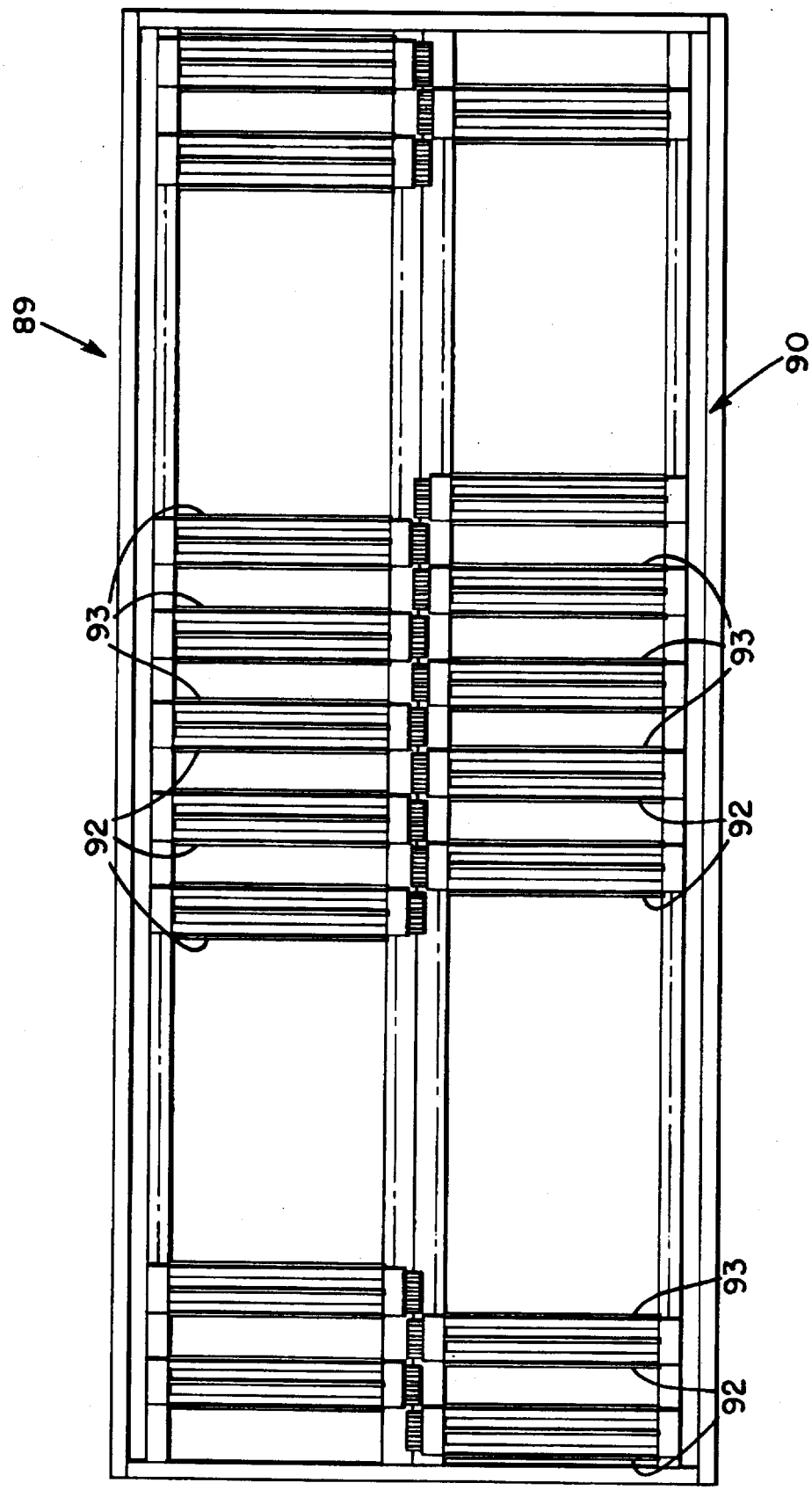

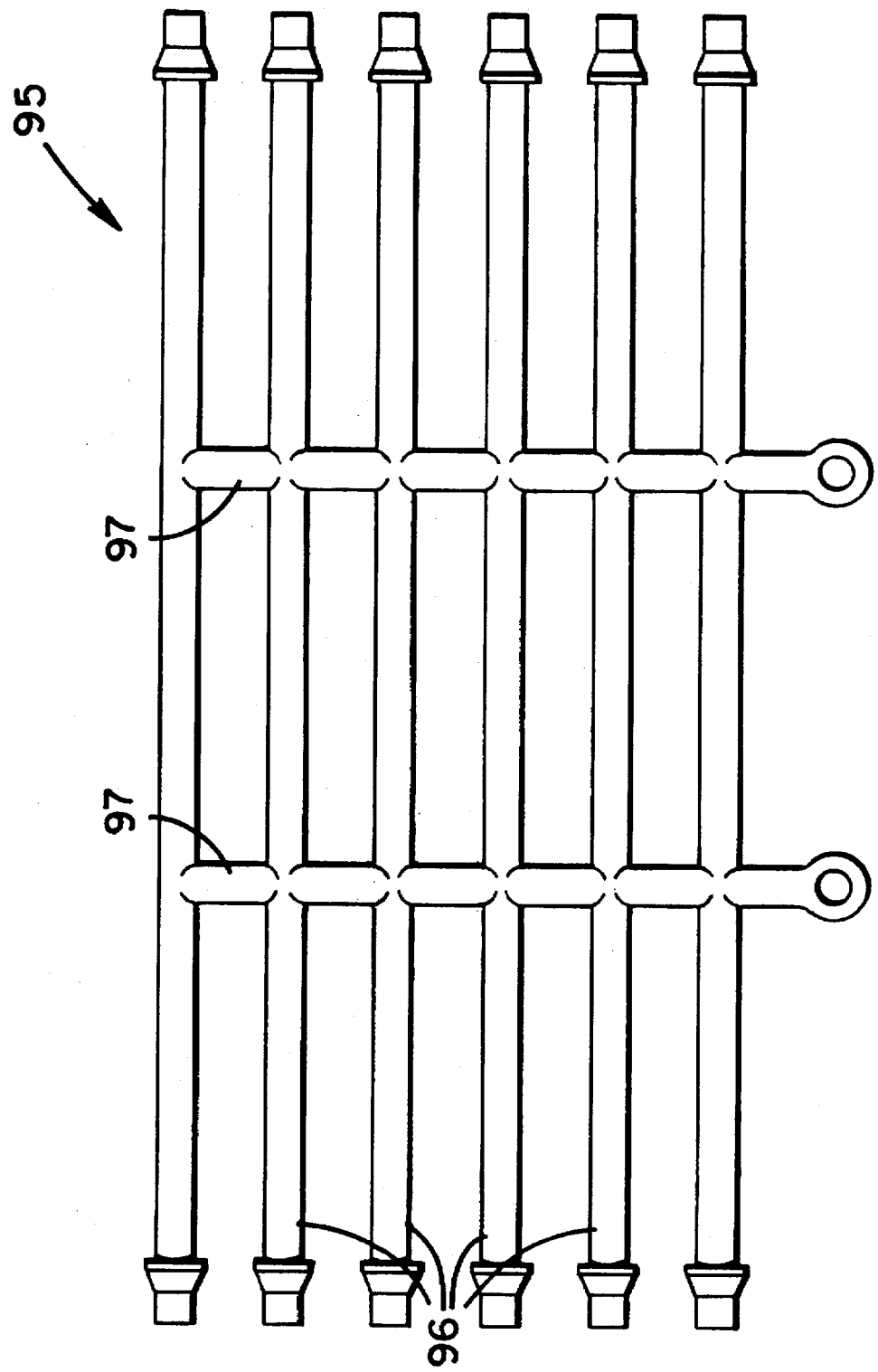

FRUIT STEAM PEELER

In steam peeler systems, fruits such as tomatoes are subjected to steam, which softens the skin. In the prior art, the tomatoes were then subjected to a disc scrubber to remove the skins and pectinous material from the tomatoes. A better way of scrubbing skins and pectinous material from the tomatoes is desired. In the prior art, powered sorters are used to separate slivers from fruit utilizing shape detectors.

The present invention provides steam peeler system which utilizes a flexible cable peeler system and a chute system that provides a change in the direction of movement of the fruit.

FIG. 1 is a schematic view of an improved fruit steam peeler.

FIG. 2 is an internal view of the flexible cable peeler used in the improved fruit steam peeler shown in FIG. 1.

FIG. 3 is a sectional view of the flexible cable peeler shown in FIG. 2 along lines 3—3.

FIG. 4 is a sectional view of the flexible cable peeler shown in FIG. 3 along lines 4—4.

FIG. 5 is a cross-sectional view of the chute shown in FIG. 1.

FIG. 6 is a plane view of the chute in FIG. 5 according to view lines 6—6.

FIG. 7 is an end view of the chute in FIG. 5 along section lines 7—7.

FIG. 8 is a schematic top view of a pinch roller assembly.

FIG. 9 is an elastic peeling cord system used in another embodiment of the invention The fruit steam peeler system shown in FIG. 1, uses an elevator 10, a pressure inlet valve 12, a pressure steamer 14, a pressure outlet valve 16, a flexible cable peeler 20, a chute 21, and a pinch roller assembly 22. The elevator 10 comprises a conveyor belt 24 following an L-shaped path. The conveyor belt 24 of the elevator 10 extends upwardly, horizontally, and then downwardly. A plurality of buckets 25 are mechanically connected to the conveyor belt 24. An elevator housing 26 surrounds part of the conveyor belt 24 and buckets 25, so that when the conveyor belt 24 and buckets 25 extend downwardly, tomatoes falling from the buckets 25 are directed by the elevator housing 26 into the pressure inlet valve 12.

The pressure inlet valve 12 comprises a pressure inlet housing 28 and a pressure inlet rotor 29. The pressure inlet rotor 29 is able to rotate in the pressure inlet housing 28. The pressure inlet rotor 29 has a plurality of fins 30 which are adjacent to the pressure inlet housing 28 as the pressure inlet rotor 29 rotates. The pressure inlet housing 28 directs tomatoes from the pressure inlet valve 12 to the pressure steamer 14.

The pressure steamer 14 comprises a pressure steamer housing 32, a pressure steamer auger 33, and a steam inlet 34. The pressure steamer housing 32 is cylindrical with a first end and a second end. The first end of the pressure steamer housing 32 is adjacent to the inlet valve 12. The second end of the pressure steamer housing 32 is adjacent to the pressure outlet valve 16. An aperture in the second end of the pressure steamer housing 32 allows tomatoes to pass to the pressure outlet valve 16.

The pressure outlet valve 16 comprises a pressure outlet housing 36 and a pressure outlet rotor 37. The pressure outlet rotor 37 is able to rotate in the pressure outlet housing 36. The pressure outlet rotor 37 has a plurality of fins 38 which are adjacent to the pressure outlet housing 36 as the pressure outlet rotor 37 rotates. A steam vent 39 is connected to the pressure outlet valve 16, to remove steam from the pressure outlet valve 16. The pressure outlet housing 36 directs tomatoes from the pressure outlet valve 16 to the flexible cable peeler 20.

The flexible cable peeler 20, FIGS. 1, 2, 3, is similar to a peeler described in U.S. Pat. No. 4,023,477. A support frame 41 supports the flexible cable peeler 20. A drive mechanism 42 is supported by the support frame 41, FIG. 2. A drive belt 43 is connected between the drive mechanism and a drive shaft pulley 44. A drive shaft 45 is journaled within the support frame 41 and is mechanically connected to the drive shaft pulley 44. A plurality of longitudinally extending spokes 48 extend radially from the drive shaft 45, with the first ends of the longitudinally extending spokes 48 mechanically connected to the drive shaft 45. A first end ring 46 is located at a first end of the drive shaft 45 inside of the support frame 41 and is supported by s the second ends of some of longitudinally extending spokes 48. A second end ring 47 is located at a second end of the drive shaft 45 inside of the support frame 41 and is supported by the second ends of some of longitudinally extending spokes 48. A helically wound continuous tube 49 extends from the first end ring 46 to the second end ring 47 winding around the drive shaft 45 and supported by the second ends of some of the longitudinally extending spokes 48. A flat, continuous helical flange 50, is welded to, and projects from the central outer surface of the helically wound continuous tube 49. Tie rods 51 parallel to the drive shaft 45 pass through the helical flange 50 and are mechanically connected to the helical flange 50 by welding and strengthen the helical flange 50. A plurality of elastic peeling cords 52 extend from one part of the helical flange 50 to another part of the helical flange 50 parallel to the drive shaft 45, with the elastic peeling cords 52 passing through apertures in the helical flange 50 and held in place in tension with peeling cord caps 53. The elastic peeling cords 52 are molded of neoprene or a similar rubber-like material which can be stretched to about 1½ times its length and will rebound to its initial length rapidly and with force. The peeling cords 52 have a ⅜ of an inch diameter.

In order to prevent excessive lateral separation of the elastic peeling cords 52, a continuous stabilizing cord 57 is wrapped around the outside of the elastic peeling cords 52 near the middle of the length of the peeling cords 52 along a path substantially parallel to the helical flange 50. The stabilizing cord 57 is formed of ⅜ inch square neoprene or a similar rubber-like material. Plastic ties 58 mechanically connect each elastic peeling cord 52 with the stabilizing cord 57. In another embodiment, the stabilizing cord 57 may be threaded over and under adjacent elastic peeling cords 52. This other embodiment provides more aggressive abrasion. The pressure outlet housing 36 provides the fruit at the first end of the flexible cable peeler 20 within the helical flange 50.

Below the flexible cable peeler 20 is a one dimensional funnel 60. Below the one dimensional funnel 60 is a linear auger 61

The chute 21 is located at the second end of the flexible cable peeler 20 for removing fruit from the flexible cable peeler 20. In this embodiment of the chute 21, FIGS. 5–7, the chute comprises an adjustable frame 62, a first grate 63, a second grate 64, and a third grate 65 with the first grate 63, second grate 64 and third grate 65 being mounted in the adjustable frame 62. The adjustable frame 62 may be adjusted through a 15 degree to 30 degree slope. In FIGS. 1 and 5 the adjustable frame 62 is adjusted so that the slope m of the chute 21 is 15 degrees from the horizontal.

The first grate 63 comprises a pair of support rods 69 which extend across the adjustable frame 62. The pair of support rods 69 are parallel to each other. Mounting plates 70 extend across the ends of the support rods 69. Bolts 71 are used to mechanically connect the mounting plates 70 to the adjustable frame 62. A plurality of round 0.5 inch diameter stainless steel grate rods 72 spaced apart extend between the support rods 69. The length of the grate rods 72 extend along the slope m of the adjustable frame 62. The support rods 69 form an inverted V-shape, with the peak of the inverted V-shape being at the center of the support rods 69.

The second grate 64 is located down slope m from the first grate 63. The second grate 64 comprises a pair of support rods 75 which extend across the adjustable frame 62. The pair of support rods 75 are parallel to each other. Mounting plates 76 extend across the ends of the support rods 75. Bolts 77 are used to mechanically connect the mounting plates 76 to the adjustable frame 62. A plurality of round 0.5 inch diameter stainless steel grate rods 78 spaced apart extend between the support rods 75. The length of the grate rods 78 extend along the slope m of the adjustable frame 62. The support rods 75 form a V-shape, with the lowest part of the V-shape being at the center of the support rods 75.

The third grate 65 is located down slope m from the second grate 64. The third grate 65 comprises a pair of support rods 82 which extend across the adjustable frame 62. The pair of support rods 82 are parallel to each other. Mounting plates 83 extend across the ends of the support rods 82. Bolts 84 are used to mechanically connect the mounting plates 83 to the adjustable frame 62. A plurality of round 0.5 inch diameter stainless steel grate rods 85 spaced apart extend between the support rods 82. The length of the grate rods 85 extend along the slope m of the adjustable frame 62. The support rods 82 form an inverted V-shape, with the peak of the inverted V-shape being at the center of the support rods 82. The support rods 82 of the third grate 65 are longer than the support rods 69, 75 of the first and second grates 63, 64.

The pinch roller assembly 22 is located down slope m from the third gate 65. FIG. 8 is a schematic top view of the pinch roller assembly 22. The pinch roller assembly 22 comprises a first conveyor 89 and a second conveyor 90 wherein each conveyor is made up of a plurality of pairs of first rollers 92 and second rollers 93. In a pair of rollers the first roller 92 rotates in an opposite direction that the rotation of the second roller 93, causing a pinching between the first roller 92 and the second roller 93.

The linear auger 61 extends under the flexible cable peeler 20, the chute 21, and the pinch roller assembly 22.

In operation, the conveyor belt 24 moves the buckets 25 causing the buckets 25 to elevate fruit such as tomatoes. The fruit is emptied from the buckets into the pressure inlet valve 12. The pressure inlet rotor 29 rotates, so that the fins 30 capture fruit between the fins 30 and the pressure inlet housing 28. This minimizes pressure escaping from the pressure steamer 14, while providing fruit into the pressure steamer 14. The pressure inlet housing 28 directs the fruit into the pressure steamer 14.

Steam is provided to the pressure steamer 14 through the steam inlet 34. The pressure steamer housing 28 maintains the steam pressure. the pressure steamer auger 33 rotates driving the fruit through the pressure steamer 12 from the pressure inlet housing 28 to the pressure outlet valve 16. The high pressure steam causes the skin of the fruit to super heat, while the bulk of the fruit remains at ambient temperature. An aperture in the pressure steamer housing 32 allows the fruit to pass to the pressure outlet valve 16. The pressure outlet rotor 37 rotates, so that the fins 38 capture fruit between the fins 38 and the pressure outlet housing 36. This minimizes pressure escaping from the pressure steamer 14, while removing fruit from the pressure steamer 14. The pressure outlet housing 36 directs the fruit into the flexible cable peeler 20. A steam vent 39 removes steam pressure from the pressure outlet valve 16. The rapid drop in pressure causes the super heated water in the skin of the fruit to flash to steam. The flashing breaks the bond between the skin and the fruit.

The drive mechanism 42 drives the drive belt 43, which drives the drive shaft pulley 44, which drives the drive shaft 45 of the flexible cable peeler 20. The drive shaft 45 drives the longitudinally extending spokes 48, which drive the helically wound continuous tube 49, the helical flange 50, the tie rods 51, and the elastic peeling cords 52. The helically wound continuous tube 49 and the helical flange 50 move the fruit from the first end of the flexible cable peeler 20 adjacent to the pressure outlet valve 16 to the second end of the flexible cable peeler 20 adjacent to the chute 21. As the helical flange 50 rotates the fruit rise up and move with the rotating helical flange 50 for a distance. Then at some point, the fruit fall to the bottom of the flexible cable peeler 20, resulting in a tumbling action. The fruit causes the elastic peeling cords 52 conform to the contour of the fruit and increases the peeling action thus removing the skin from the fruit. The skin removed from the fruit and slivers from the fruit pass between the elastic peeling cords 52 into the one dimensional funnel 60 which funnels the skins and slivers into the linear auger 61.

From the flexible cable peeler 20 the fruit passes to the chute 21. The fruit first reach the first grate 63 of the chute 21. The fruit coming from the flexible cable peeler 20 cover a small area. Because the support rods 69 of the first grate 63 are in an inverted V-shape, the fruit spread out to a larger area, by rolling towards the ends of the support rods 69 of the first grate 63. Since in the preferred embodiment, the adjustable frame 62 is adjusted to a 15 degree slope the fruit also roll or slide along the length of the grate rods 72 of the first grate 63, to the second grate 64. Some of the skins and slivers pass through the grate rods 72 of the first grate 63 to the linear auger 61. Since the support rods 75 of the second grate 64 are in a V-shape, the fruit movement changes and the fruit rolls towards the center of the second grate 64. This change in direction, helps to remove additional skin and slivers, which pass through the grate rods 78 of the second grate 64 to the linear auger 61. Since in the preferred embodiment, the adjustable frame 62 is adjusted to a 15 degree slope the fruit also roll or slide along the length of the grate rods 78 of the second grate 64, to the third grate 65. Since the support rods 82 of the third grate 65 are in an inverted V-shape, the fruit movement changes and the fruit rolls towards the ends of the third grate 65. This change in direction, helps to remove additional skin and slivers, which pass through the grate rods 85 of the third grate 65 to the linear auger 61. Since in the preferred embodiment, the adjustable frame 62 is adjusted to a 15 degree slope the fruit also roll or slide along the length of the grate rods 85 of the third grate 65, to the pinch roller assembly 22. Since the fruit rolls towards the ends of the third grate 65, the fruit is spread out before it reaches the more spread out pinch roller assembly 22.

The pinch roller assembly 22 conveys the fruit from the chute 21. The pairs of first rollers 92 and second rollers 93 provide a pinching action to further remove any remaining skin and slivers.

The auger 61 moves the peels and slivers that fall from the flexible cable peeler 20, the chute 21 and the pinch roller assembly 22 to a skin collector.

FIG. 9 illustrates an elastic cord system used in another embodiment of the invention. A web 95 comprises a plurality of elastic peeling cords 96. The plurality of elastic peeling chords 96 are held together by a plurality of elastic connecting cords 97, which are molded with the elastic peeling chords 96. The web 95 is used to replace the elastic peeling cords, the stabilizing cord, and the plastic ties in the previous embodiment. The plastic peeling cords 96 are mounted into the helical flange of the previous embodiment in the same manner as the elastic cords in the previous embodiment.

Although the best mode contemplated for carrying out the present invention has been herein shown and described, it will be understood that modification and variation may be made without departing from what is regarded to be the subject matter of the invention.

What is claimed is:

1. An apparatus for removing skin from fruit, comprising:

means for exposing the fruit to a high temperature steam;

a flexible cable peeler, wherein the flexible cable peeler, comprises:
  a support frame
  a drive shaft journaled to the support frame;
  a helical flange supported by the drive shaft and surrounding the drive shaft; and
  a web formed by a plurality of elastic peeling cords and a plurality of connecting cords molded to the plurality of elastic peeling cords, and wherein the plurality of elastic peeling cords are held in tension by the helical flange, forming a cylinder surrounding the drive shaft;

means for transferring the fruit from the means for exposing to the flexible cable peeler, between the means for exposing and the flexible cable peeler;

a chute for removing the fruit from the flexible cable peeler, adjacent to the flexible cable peeler; and a pinch roller assembly adjacent to the chute.

2. An apparatus for removing skin from fruit, comprising:

means for exposing the fruit to a high temperature steam;

a flexible cable peeler, wherein the flexible cable peeler, comprises:
  a support frame
  a drive shaft journaled to the support frame;
  a helical flange supported by the drive shaft and surrounding the drive shaft; and
  a plurality of elastic peeling cords held in tension by the helical flange, forming a cylinder surrounding the drive shaft;

means for transferring the fruit from the means for exposing to the flexible cable peeler, between the means for exposing and the flexible cable peeler;

a chute for removing the fruit from the flexible cable peeler, adjacent to the flexible cable peeler; and a pinch roller assembly adjacent to the chute.

3. The apparatus, as claimed in claim 2, wherein the chute, comprises:

an adjustable frame with an adjustable slope;

a first rack supported by the adjustable frame;

a second rack supported by the adjustable frame; and a third rack supported by the adjustable frame.

4. The chute, as recited in claim 3, wherein the first rack comprises:

at lest one support bar in the shape of an inverted V; and a plurality of parallel grate bars with a length, wherein the length of the grate bars is along the adjustable slope of the adjustable frame.

5. The chute, as recited in claim 4, wherein the second rack comprises:

at lest one support bar in the shape of an inverted V; and a plurality of parallel grate bars with a length, wherein the length of the grate bars is along the adjustable slope of the adjustable frame, and wherein the second rack is located down the adjustable slope of the adjustable frame from the first rack.

6. The chute, as recited in claim 5, wherein the third rack comprises:

at lest one support bar in the shape of an inverted V; and a plurality of parallel grate bars with a length, wherein the length of the grate bars is along the adjustable slope of the adjustable frame, and wherein the third rack is located down the adjustable slope of the adjustable frame from the second rack.

7. An apparatus for removing skin from fruit, comprising:

means for exposing the fruit to a high temperature steam;

a flexible cable peeler;

means for transferring the fruit from the means for exposing to the flexible cable peeler, between the means for exposing and the flexible cable peeler; a chute for removing the fruit from the flexible cable peeler, adjacent to the flexible cable peeler, wherein the chute, comprises:

an adjustable frame with an adjustable slope;

a first rack supported by the adjustable frame, wherein the first rack has the shape of an inverted V;

a second rack supported by the adjustable frame, wherein the second rack has the shape of a V; and a third rack supported by the adjustable frame, wherein the third rack has the shape of an inverted V; and a pinch roller assembly adjacent to the chute.

8. The chute, as recited in claim 7, wherein the first rack comprises:

at lest one support bar in the shape of an inverted V; and a plurality of parallel grate bars with a length, wherein the length of the grate bars is along the adjustable slope of the adjustable frame.

9. The chute, as recited in claim 8, wherein the second rack comprises:

at lest one support bar in the shape of an inverted V; and a plurality of parallel grate bars with a length, wherein the length of the grate bars is along the adjustable slope of the adjustable frame, and wherein the second rack is located down the adjustable slope of the adjustable frame from the first rack.

10. The chute, as recited in claim 9, wherein the third rack comprises:

at test one support bar in the shape of an inverted V; and a plurality of parallel grate bars with a length, wherein the length of the grate bars is along the adjustable slope of the adjustable frame, and wherein the third rack is located down the adjustable slope of the adjustable frame from the second rack.

* * * * *